(12) United States Patent
Park et al.

(10) Patent No.: US 9,714,880 B2
(45) Date of Patent: Jul. 25, 2017

(54) INERTIA TEST APPARATUS FOR MODEL SHIP

(71) Applicant: Korea Institute of Ocean Science And Technology, Gyeonggi-do (KR)

(72) Inventors: In Bo Park, Daejeon (KR); Sung Kwon Choi, Daejeon (KR); Jin Ha Kim, Daejeon (KR); Yeonguk Won, Daejeon (KR); Young-Sik Kim, Daejeon (KR); Hong Gun Sung, Daejeon (KR); Sa Young Hong, Daejeon (KR); Jang Pyo Hong, Daejeon (KR); Suk Kyu Cho, Daejeon (KR)

(73) Assignee: KOREA INSTITUTE OF OCEAN SCIENCE AND TECHNOLOGY, Gyeonggi-Do (KR)

( * ) Notice: Subject to any disclaimer, the term of this patent is extended or adjusted under 35 U.S.C. 154(b) by 79 days.

(21) Appl. No.: 14/877,431

(22) Filed: Oct. 7, 2015

(65) Prior Publication Data

US 2016/0138994 A1    May 19, 2016

(30) Foreign Application Priority Data

Nov. 18, 2014  (KR) .............................. 2014-0161030

(51) Int. Cl.
*G01M 1/12*    (2006.01)
(52) U.S. Cl.
CPC .................................. *G01M 1/122* (2013.01)
(58) Field of Classification Search
CPC ...................................................... G01M 1/122

USPC ......................................................... 73/65.04
See application file for complete search history.

(56) References Cited

U.S. PATENT DOCUMENTS

| 5,833,545 A * | 11/1998 | Pinch ................... A47D 13/105 297/273 |
| 2002/0063457 A1* | 5/2002 | Hsia ...................... A47D 13/102 297/271.6 |
| 2007/0287599 A1* | 12/2007 | Chartrand ............... A63B 69/00 482/23 |

(Continued)

FOREIGN PATENT DOCUMENTS

| JP | 10-132699 | 5/1998 |
| JP | 4691706 | 3/2011 |

(Continued)

*Primary Examiner* — Clayton E Laballe
*Assistant Examiner* — Dennis Hancock
(74) *Attorney, Agent, or Firm* — Dentons US LLP (57) ABSTRACT

The present invention provides an inertia test apparatus for a model ship that mimics a pitching inertia radius of an actual ship by reciprocating a model ship. The apparatus includes a base frame providing a supporting force, vertical frames integrally fixed at both sides of the base frame and having a hinge shaft on an upper end, a swing including a pair of fixing members rotatably hung on the hinge shafts of the vertical frames and a bed integrally formed at a lower ends of the fixing members, and providing a pitching inertia radius of the model ship by reciprocating about the hinge shafts, with the model ship seated on the bed, and a centering adjuster seating the model ship on the bed of the swing and matching a center of gravity of the model ship with a center of the swing by allowing the model ship to move.

4 Claims, 6 Drawing Sheets

(56) References Cited

U.S. PATENT DOCUMENTS

2012/0083349 A1* 4/2012 Lin ................... A47D 13/105
                                                          472/119

FOREIGN PATENT DOCUMENTS

| JP | 2014-108838 | 6/2014 |
|----|-------------|--------|
| KR | 973756      | 7/2010 |

* cited by examiner

RELATED ART

INERTIA TEST APPARATUS FOR MODEL SHIP

CROSS-REFERENCE TO RELATED APPLICATION

This application claims priority to Korean Patent Application No. KR 2014-0161030 filed on Nov. 18, 2014 and all the benefits accruing therefrom under 35 U.S.C. §119, the contents of which are incorporated by reference in its entirety.

BACKGROUND OF THE INVENTION

Field of the Invention

The present invention relates to an inertia test apparatus for a model ship and, more particularly, to an inertia test apparatus for a model ship that can mimic an inertial radius of an actual ship by testing a pitching inertial radius of a model ship for dynamic similitude with an actual ship.

Description of the Related Art

In general, fluidic performance of ocean objects such as a ship and a submarine under various situations are examined by performing performance tests at test facilities, such as a towing tank, on scale models having the same shapes as actual vessels.

An inertial test, one of various performance tests performed on models, is a test for mimicking a pitching inertia radius of an actual ship.

Figure 1:
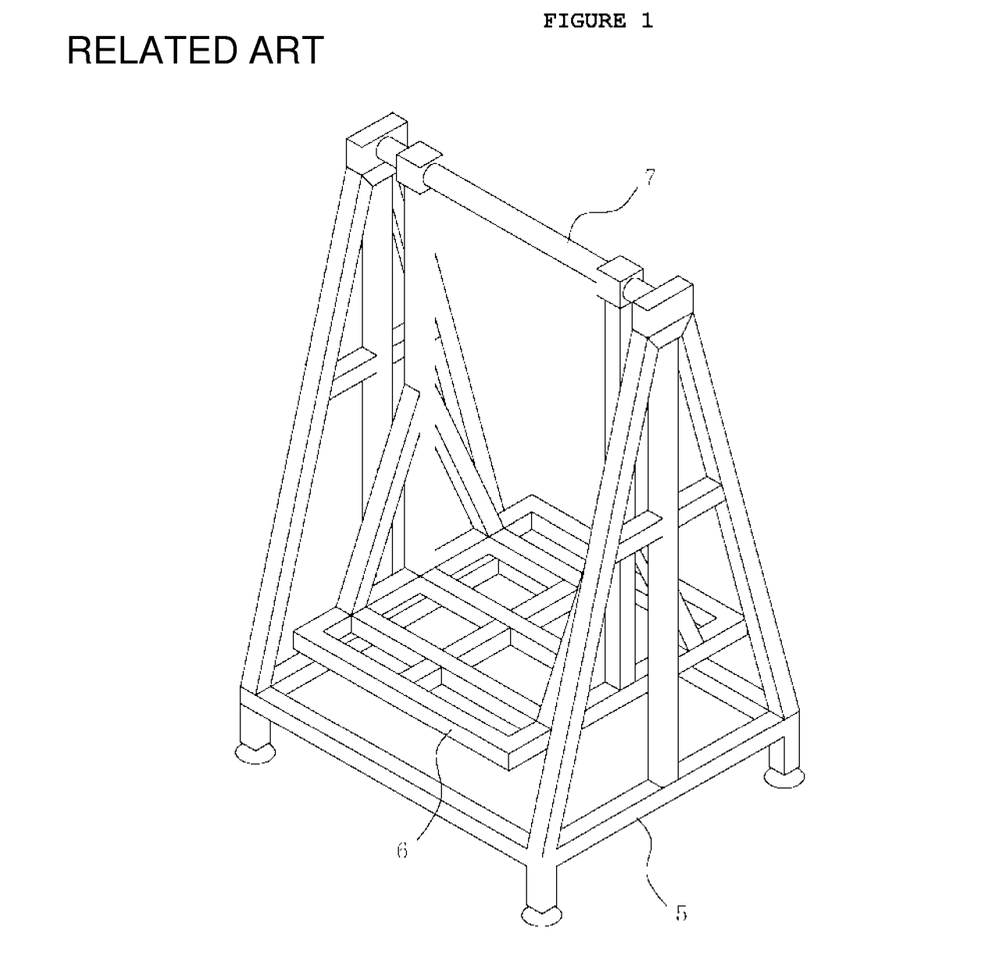
FIG. 1 is a perspective view showing an inertia test apparatus according to the related art.

Such an inertia test has been performed by a test apparatus of the related art shown in FIG. 1.

The inertia test apparatus includes a baser frame 5 providing a supporting force and a swing 6 hung on the base frame 5 to reciprocally swing.

A model ship is placed on the swing 6 of the inertia test apparatus by equipment such as forklift or a crane and then a pitching inertia test is performed with the swing 6 reciprocating.

In the pitching inertia test, an exact test result can be achieved only when the center of gravity of model ship is matched with the center of the swing.

However, a model ship cannot be moved, after being placed on the swing of the inertia test apparatus of the related art.

Accordingly, when using the inertia test apparatus, it is required to check the center of gravity after placing a model ship on the swing, and then repeatedly check the center of gravity while lifting and moving the model ship with a forklift or a crane, so it is very inconvenient and time-consuming.

Further, since support bar 7 is disposed over the swing in the inertia test apparatus of the related art, a model ship cannot be vertically placed on the swing 6 from above, but is required to be paced horizontally from a side of the swing 6.

Therefore, a model ship cannot be placed in the inertia test apparatus of the related art by a crane, but has to be placed on the swing 6 only by a forklift.

PRIOR ART DOCUMENT

[Patent Document] Korean Patent No. 10-0973756

SUMMARY OF THE INVENTION

Accordingly, the present invention has been made keeping in mind the above problems occurring in the related art, and the present invention is intended to propose an inertia test apparatus for a model ship that can easily match the center of gravity of a model ship with the center of a swing by making the model ship movable on the swing even without lifting the model ship with equipment such as a forklift or a crane.

Further, the preset invention provides an inertia test apparatus for a model ship that can place a model ship on a swing from above, using various types of equipment such as a crane in addition to a forklift, because the area above the swing is open.

In order to achieve the above object, according to one aspect of the present invention, there is provided an inertia test apparatus for a model ship that mimics a pitching inertia radius of an actual ship by reciprocating a model ship. The apparatus includes: a base frame providing a supporting force; vertical frames integrally fixed at both sides of the base frame and having a hinge shaft on an upper end; a swing including a pair of fixing members rotatably hung on the hinge shafts of the vertical frames and a bed integrally formed at a lower ends of the fixing members, and providing a pitching inertia radius of the model ship by reciprocating about the hinge shafts, with the model ship seated on the bed; and a centering adjuster seating the model ship on the bed of the swing and matching a center of gravity of the model ship with a center of the swing by allowing the model ship to move.

The centering adjuster may include: a lifting frame vertically movably disposed in a chamber formed in the shape of a groove at a center of the swing, supporting the model ship when protruding over the bed, and placing the model ship on the bed when moving down under the bed; rollers rotatably coupled to the lifting frame, supporting the model ship in a movable state in close contact with the model ship when the lifting frame is moved up, and being separated from the model ship when the lifting frame is moved down; and a lifting mechanism disposed in the chamber of the bed and moving up and down the lifting frame.

The lifting mechanism may include: a rotary shaft disposed under the lifting frame, providing torque, and having a thread longitudinally formed; a movable shaft having a first end thread-fastened to the rotary shaft and a second end extending perpendicular to the rotary shaft, and moving in a longitudinal direction of the rotary shaft when the rotary shaft is rotated; and lifting links coupled to the second end of the movable shaft, supporting the lifting frame, with both ends rotatably coupled to the lifting frame and the chamber of the bed, and moving up or down the lifting frame by opening or closing when the movable shaft is moved.

The lifting link may include: a first link arm having a first end rotatably coupled to a hinge shaft on the lifting frame and a second end rotatably coupled to the movable shaft; and a second link arm having a first end rotatably coupled to a hinge shaft on the chamber of the bed and a second end coupled to the movable shaft to be rotated with the first link arm.

The second ends of the first link arm and the second link arm may extend away from the hinge shafts toward the chamber of the bed and the lifting frame, respectively, and the lifting links may further include support rollers rotatably coupled to the second ends of the first link arm and the second link arm and supporting the chamber of the bed and the lifting frame, respectively.

According to the inertia test apparatus for a model ship of the present invention, since rollers are disposed at the lifting frame of the centering adjuster, a model ship can be moved with the lifting frame lifted and the center of gravity of a model ship can be matched with the center of the swing, so the time taken to prepare a test can be considerably reduced.

Further, according to the present invention, since the lifting mechanism of the centering adjuster moves the movable shaft when the rotary shaft is rotated, the lifting frame is moved up or down by the lifting links that are opened or closed, so the lifting frame can be stably moved up and down.

Further, according to the present invention, since the lifting links have the extending link arms and the support rollers are disposed at the extending ends and support the lifting frame and the chamber of the bed, the lifting frame can more firmly support a model ship while it is lifted up.

Further, according to the present invention, since the fixing members of the swing are rotatably coupled to hinge shafts on a pair of vertical frames and the area over the swing is open, it is possible to mount a model ship from above the swing with various types of equipment.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Exemplary embodiments of the present invention will be described more fully hereinafter with reference to the accompanying drawings. In the following description of the present invention, detailed descriptions of known functions and components incorporated herein will be omitted.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 2:
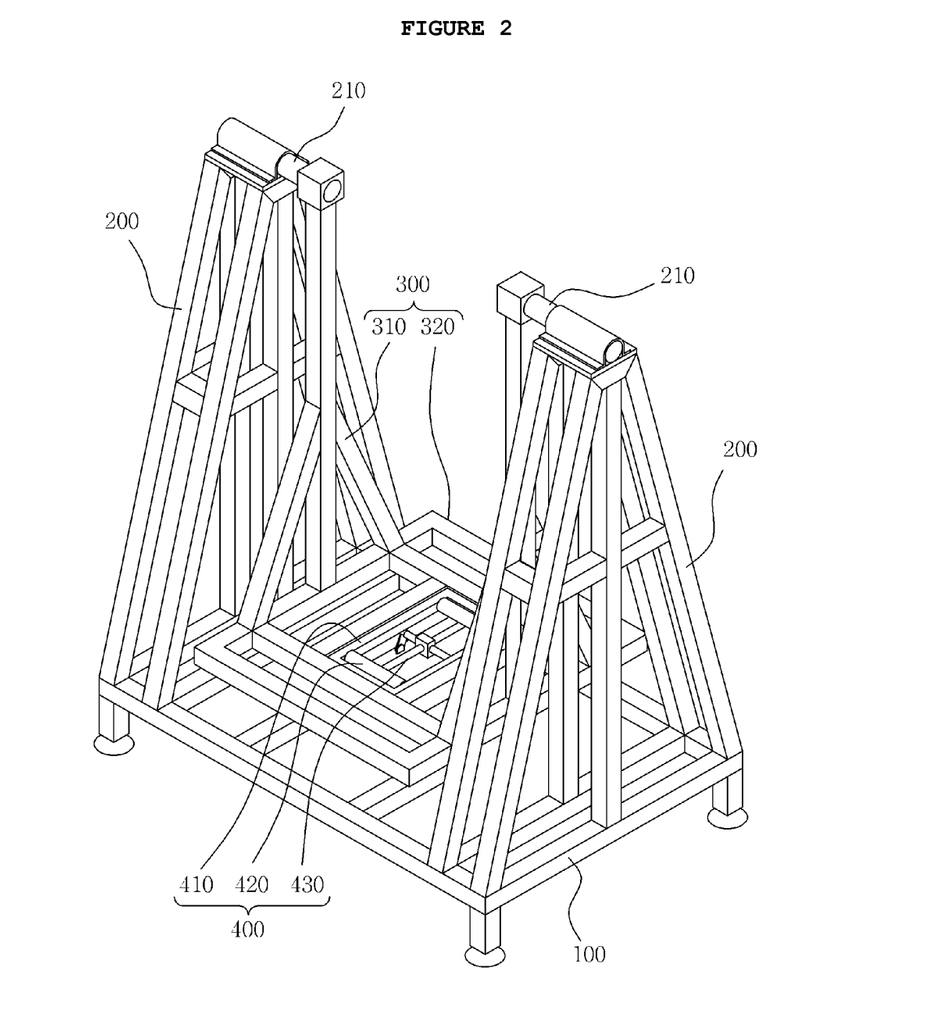
FIG. 2 is a perspective view showing an inertia test apparatus for a model ship according to the present invention.

An inertia test apparatus for a model ship according to the present invention may include, as shown in FIG. 2, a base frame 100, vertical frames 200, a swing 300, and a centering adjuster 400.

The support frame 100 is a member for providing a supporting force.

The base frame 100 may be fixed on the ground, or may be movable using a moving member such as casters (not shown) on the bottom.

The vertical frames 200 integrally and vertically fixed at both sides of the base frame 100, as shown in FIG. 2, so they function as pillars supporting the swing 300, which will be described below.

A hinge shaft 210 is disposed at the tops of the vertical frames 200 and supports the swing 300, as shown in FIG. 2, so the swing 300 can reciprocate.

The swing 300 is held on the hinge shafts 210 of the vertical frames 200 to be able to swing, so it provides a pitching inertia radius of a model ship while reciprocating the model ship.

The swing 300, as shown in FIG. 2, includes a pair of fixing members 310 having an upper end rotatably coupled to the hinge shafts 210 of the vertical frames 200 and a bed 320 integrally formed at the lower ends of the fixing members 310 to seat a model ship.

That is, while the swing 300 repeatedly swings about the hinge shafts 210 of the vertical frame 200, with the model ship on the bed 320, the pitching inertia radius of the model ship is tested.

Since the hinge shafts 210 where the vertical members 310 are coupled are separately disposed on the vertical frames 200, the area above the swing 300 is open, so a model ship can be placed on the bed 320 from above by various types of equipment such as a crane or a forklift.

The centering adjuster 400 is provided to seat a model ship on the bed 320 of the swing 300 and easily move the center of gravity of the model ship to the center of the swing 300.

Figure 3:
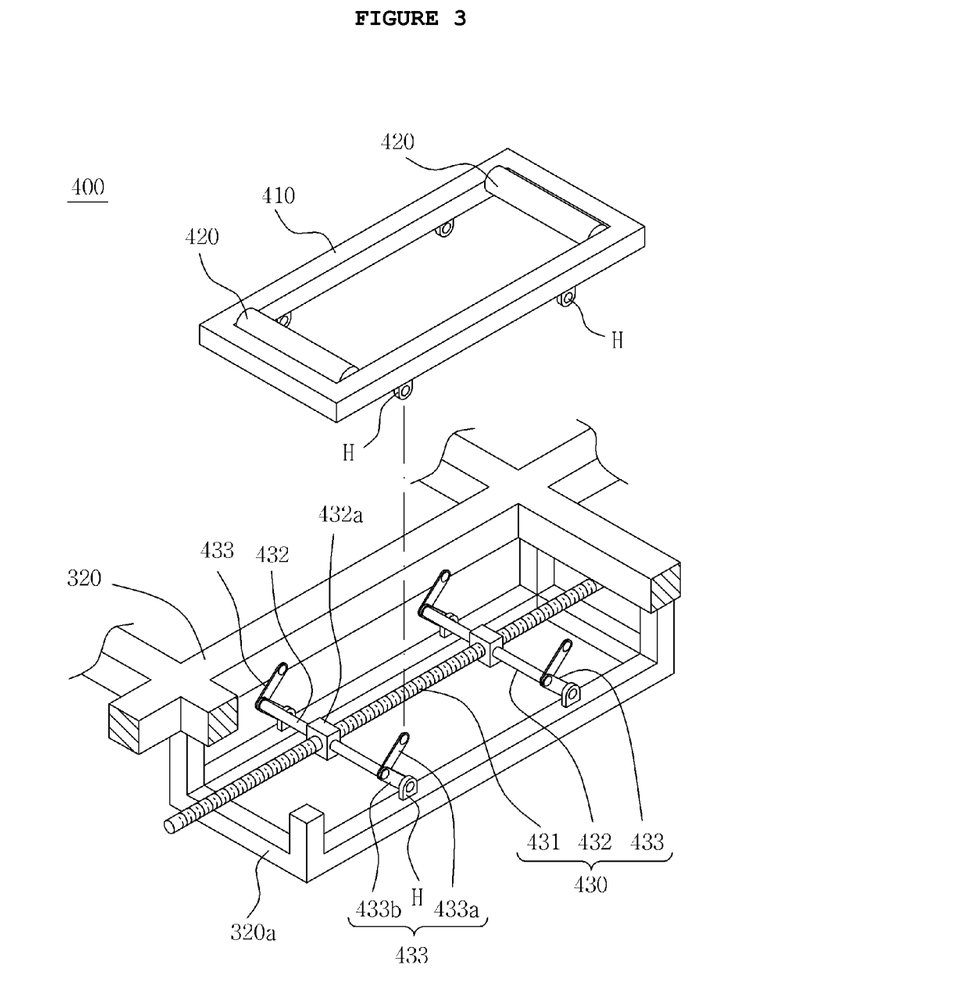
FIG. 3 is an exploded perspective view showing a centering adjuster shown in FIG. 2.

The centering adjuster 400, for example, may include a lifting frame 410, a roller 420, and a lifting assembly 430, as shown in FIG. 3.

The lifting frame 410 is coupled to the bed 320 of the swing 300, and supports a model ship by moving up or seats a model ship onto the bed 320 by moving down.

Figure 4:
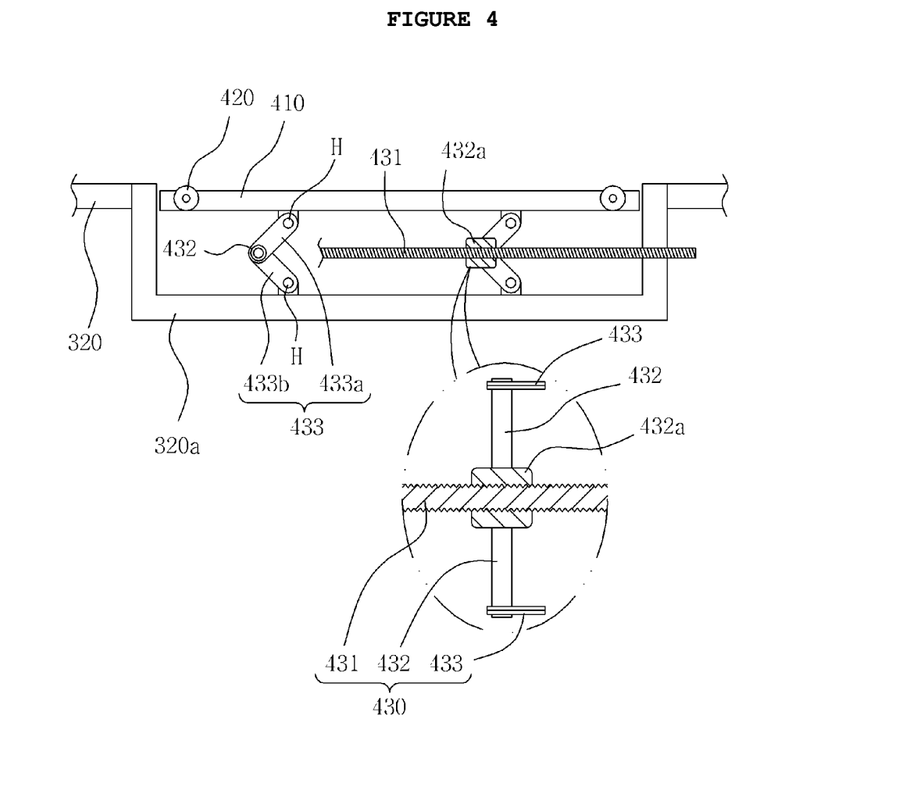
FIG. 4 is vertical cross-sectional view showing the centering adjuster shown in FIG. 2.

The lifting frame 410, as shown in FIGS. 3 and 4, is disposed in a chamber 320a formed like a groove at the center of the bed 320 and can be moved up/down therein by the lifting assembly 430, which will be described below.

The rollers 420 are rotatably coupled to the lifting frame 410, as shown in FIGS. 3 and 4, in order that the center of gravity of a model ship can be adjusted by movably supporting the model ship to allow the model ship to move.

Figure 5:
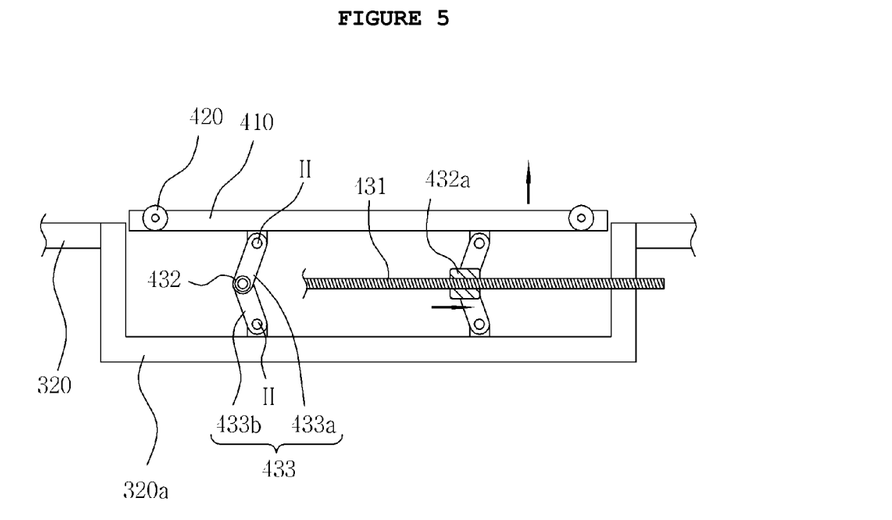
FIG. 5 is vertical cross-sectional view showing operation of the centering adjuster shown in FIG. 4.

That is, as shown in FIG. 5, as the lifting frame 410 is moved up over the bed 320, the rollers 420 movably support a model ship. Further, when the lifting frame 410 is moved down into the chamber 320a, as shown in FIG. 4, the rollers 420 are separated from a model ship and the model ship is seated on the bed 320.

The lifting assembly 430, as shown in FIG. 3, is disposed in the chamber 320a of the bed 320 and moves up/down the lifting frame 410.

The lifting assembly 430, as shown in FIG. 3, for example may include a rotary shaft 431, a movable shaft 432, and lifting links 433.

The rotary shaft 431, a member providing torque by being rotated by a user, as shown in FIG. 3, is disposed under the lifting frame 410 in the chamber 320a and has a thread that is longitudinally formed.

The movable shaft 432 is moved in the longitudinal direction of the rotary shaft 431, when the rotary shaft 431 is rotated.

The movable shaft 432, as shown in FIGS. 3 and 4, has a first end thread-fastened to the rotary shaft 431 through a female threaded-portion 432a and a second end extending perpendicular to the rotary shaft 431 out of the lifting frame 410.

The lifting link 433 that will be described below is fixed to the second end of the movable shaft 432 to prevent rotation, so when the rotary shaft 431 is rotated, the female threaded-portion 432a is horizontally moved in the longitudinal direction of the rotary shaft 431, thereby operating the lifting link 433.

The lifting link 433, as shown in FIG. 3, is coupled to the second end of the movable shaft 432 and can be opened/closed and both ends are rotatably coupled to the lifting frame 410 and the chamber 320a of the bed 320, so when the movable shaft 432 is horizontally moved, the lifting link 433 supporting the lifting frame 410 is opened or closed to lift the lifting frame 410, as shown in FIGS. 4 and 5.

In detail, the lifting link 433, as shown in FIGS. 3 and 4, is composed of a first link arm 433a and a second link arm 44b coupled to each other to be opened/closed and movably coupled to the movable shaft 432. An end of the first link arm 433a is rotatably coupled to a hinge shaft H of the lifting frame 410 and an end of the second link arm 433b is rotatably coupled to a hinge shaft H of the chamber 320a, thereby supporting the lifting frame 410.

Accordingly, when the lifting shaft 432 is moved forward by forward rotation of the rotary shaft 431, the first link arm 433a and the second link arm 433b of the lifting link 433 are opened and lift the lifting frame 410, as shown in FIG. 5.

Further, when the lifting shaft 432 is moved backward by backward rotation of the rotary shaft 431, the first link arm 433a and the second link arm 433b of the lifting link 433 are closed and move the lifting frame 410 down, as shown in FIG. 4.

Figure 6:
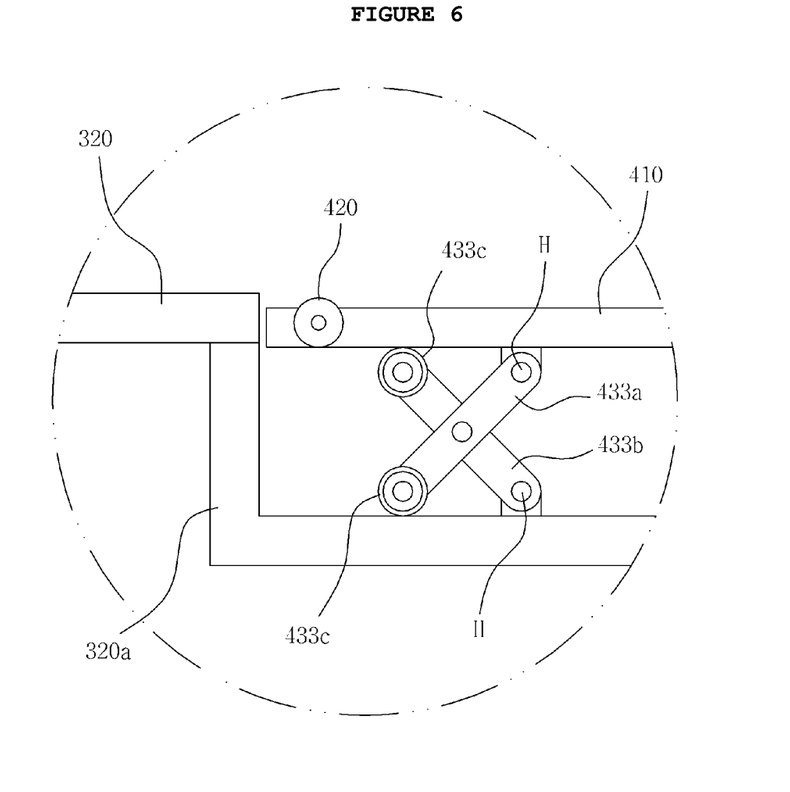
FIG. 6 is a vertical cross-sectional view showing another embodiment of a lifting assembly shown in FIG. 4.

In the lifting link 433, the ends of the first link arm 433a and the second link arm 433b can make an X-shape by extending toward the chamber 320a and the lifting frame 410, respectively, as shown in FIG. 6, and support rollers 433c are rotatably disposed at the extending ends, so the chamber 320a and the lifting frame 410 can be more firmly supported.

Operation of the present invention including the components described above will now be described.

In order to perform an inertia test on a model ship, a tester lifts and places a model ship on the bed of the swing 300, using equipment such as a crane or a forklift.

Further, after separating the equipment from the model ship, the tester checks whether the center of gravity of the model ship and the center of the swing 300 are matched. When the center of gravity of the model ship and the center of the swing 300 are not matched, the tester matches the centers by moving the model ship after lifting the lifting frame 410 and the rollers 420 by rotating the rotary shaft 431 forward.

As the lifting shaft 432 is moved forward and presses the lifting links 433 by forward rotation of the rotary shaft 421, as shown in FIG. 5, the lifting frame 410 and the rollers 420 are lifted by the lifting links 433 that are opened, so the lifting frame 410 and the rollers 420 movably support the model ship at the positions and allow the center of gravity of the model ship to be moved.

After matching the center of gravity of the model ship with the center of the swing, the tester moves the lifting frame 410 and the rollers 420 down and places the model ship on the bed 320 by rotating the rotary shaft 431 backward.

As the lifting shaft 432 is moved backward and presses the lifting links 433 by backward rotation of the rotary shaft 421, as shown in FIG. 4, the lifting frame 410 and the rollers 420 are moved down by the lifting links 433 that are closed, so the lifting frame 410 and the rollers 420 are moved down into the chamber 320a and separated from the model ship, and accordingly the model ship is left on the bed 320.

As described above, according to the inertia test apparatus for a model ship of the present invention, since the rollers 420 are disposed on the lifting frame 410 of the centering adjuster 400, a model ship can be moved when the lifting frame 410 is raised, so it is possible to easily match the center of gravity of a model ship with the center of the swing 300, and accordingly, the time taken to prepare the test can be considerably reduced.

Further, according to the present invention, since the lifting mechanism 430 of the centering adjuster 400 moves the movable shaft 432 when the rotary shaft 431 is rotated and the lifting links 433 lift the lifting frame 410 by opening or closing, the lifting frame 410 can be stably lifted.

Further, according to the present invention, since the link arms 433a and 433b of the lifting link 433 extend and the support rollers 433b are disposed at the extending end and can support the lifting frame 410 and the chamber 320a of the bed 320, the lifting frame 410 can move up while more firmly supporting a model ship.

Further, according to the present invention, since the fixing members 310 of the swing 300 are rotatably coupled to the hinge shafts 210 disposed on a pair of vertical frames 200, the area over the swing 300 is open, thus it is possible to mount a model ship on the swing 300 from above using various types of equipment.

The present invention was described with reference to the exemplary embodiments, but those are provided only for explanation and are not intended to limit the scope of the present invention. It will be understood to those skilled in the art that the present invention may be replaced, changed, and modified in various ways without departing from the spirit of the present invention.

What is claimed is:

1. An inertia test apparatus for a model ship that mimics a pitching inertia radius of an actual ship by reciprocating a model ship, the apparatus comprising:

a base frame providing a supporting force;

vertical frames integrally fixed at both sides of the base frame and having a hinge shaft on an upper end;

a swing including a pair of fixing members rotatably hung on the hinge shafts of the vertical frames and a bed integrally formed at a lower ends of the fixing members, and providing a pitching inertia radius of the model ship by reciprocating about the hinge shafts, with the model ship seated on the bed; and a centering adjuster seating the model ship on the bed of the swing and matching a center of gravity of the model ship with a center of the swing by allowing the model ship to move, the centering adjuster including (a) a lifting frame vertically movably disposed in a chamber formed in the shape of a groove at a center of the swing, supporting the model ship when protruding over the bed, and placing the model ship on the bed when moving down under the bed, (b) rollers rotatably coupled to the lifting frame, supporting the model ship in a movable state in close contact with the model ship when the lifting frame is moved up, and separated from the model ship when the lifting frame is moved down, and (c) a lifting mechanism disposed in the chamber of the bed and moving up and down the lifting frame.

2. The apparatus of claim 1, wherein the lifting mechanism includes:

a rotary shaft disposed under the lifting frame, providing torque, and having a thread longitudinally formed;

a movable shaft having a first end thread-fastened to the rotary shaft and a second end extending perpendicular to the rotary shaft, and moving in a longitudinal direction of the rotary shaft when the rotary shaft is rotated; and lifting links coupled to the second end of the movable shaft, supporting the lifting frame, with both ends rotatably coupled to the lifting frame and the chamber of the bed, and moving up or down the lifting frame by opening or closing when the movable shaft is moved.

3. The apparatus of claim 2, wherein the lifting link includes:

a first link arm having a first end rotatably coupled to a hinge shaft on the lifting frame and a second end rotatably coupled to the movable shaft; and a second link arm having a first end rotatably coupled to a hinge shaft on the chamber of the bed and a second end coupled to the movable shaft to be rotated with the first link arm.

4. The apparatus of claim 3, wherein the second ends of the first link arm and the second link arm extend away from the hinge shafts toward the chamber of the bed and the lifting frame, respectively, and the lifting links further include support rollers rotatably coupled to the second ends of the first link arm and the second link arm and supporting the chamber of the bed and the lifting frame, respectively.

* * * * *